United States Patent
Fuchs, Jr.

[11] 3,756,108
[45] Sept. 4, 1973

[54] TUBE CUTTER
[75] Inventor: Francis Joseph Fuchs, Jr., Princeton Junction, N.J.
[73] Assignee: Western Electric Company, Incorporated, New York, N.Y.
[22] Filed: Dec. 13, 1971
[21] Appl. No.: 207,333

[52] U.S. Cl. ........................ 83/193, 83/54, 83/639, 83/688
[51] Int. Cl. ............................................. B26d 3/16
[58] Field of Search ...................... 83/193, 192, 194, 83/639, 54, 688, 695

[56] References Cited
UNITED STATES PATENTS

| | | | |
|---|---|---|---|
| 1,981,059 | 11/1934 | Matthews et al. | 83/54 X |
| 3,230,812 | 1/1966 | Pucci et al. | 83/639 X |
| 3,374,697 | 3/1968 | Robinson | 83/192 X |
| 3,430,290 | 3/1969 | Kinslow, Jr. | 83/54 X |
| 3,449,993 | 6/1969 | Temple et al. | 83/54 X |
| 3,478,388 | 11/1969 | Turner | 83/54 X |

FOREIGN PATENTS OR APPLICATIONS
784,289  10/1957  Great Britain ........................ 83/193

Primary Examiner—Frank T. Yost
Attorney—Jack Schuman

[57] ABSTRACT

A plurality of wedge-shaped cutting members having spaced arcuate cutting edges are urged radially inwardly by fluid pressure to contract about and sever a mandrel-held tube in two longitudinally spaced planes. Each cutting member has spaced side cutting edges adapted to engage the spaced side cutting edges of an adjacent cutting member, thereby to remove flash resulting from the severing operation. The fluid pressure is exerted through a resilient sheathing simultaneously about the entire array of cutting members. Leaf springs urge the entire array radially outwardly to expand the array when fluid pressure is removed from the array of cutting members.

8 Claims, 4 Drawing Figures

Patented Sept. 4, 1973
3,756,108
2 Sheets-Sheet 1
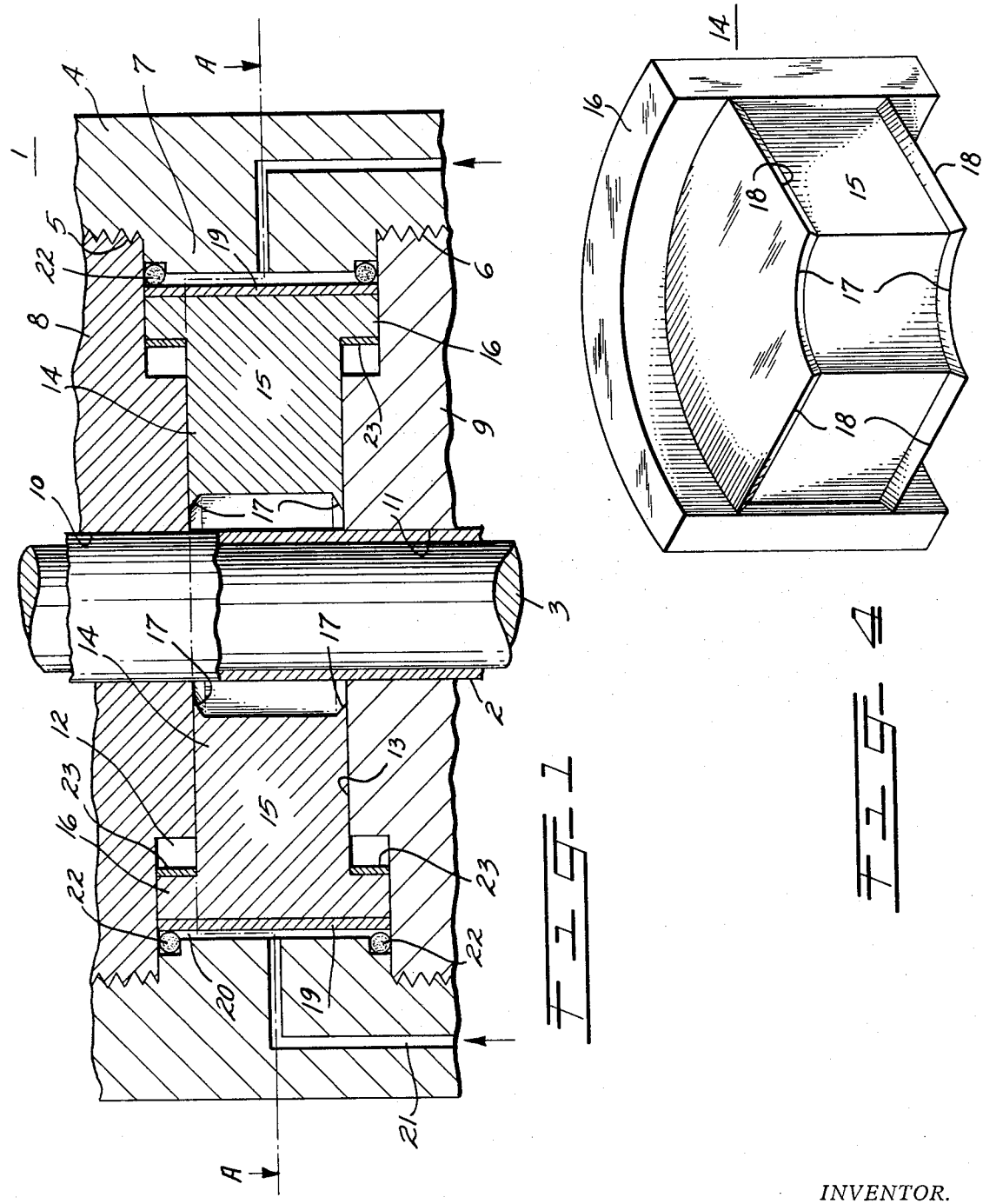
INVENTOR.
FRANCIS J. FUCHS JR.
BY
ATTORNEY

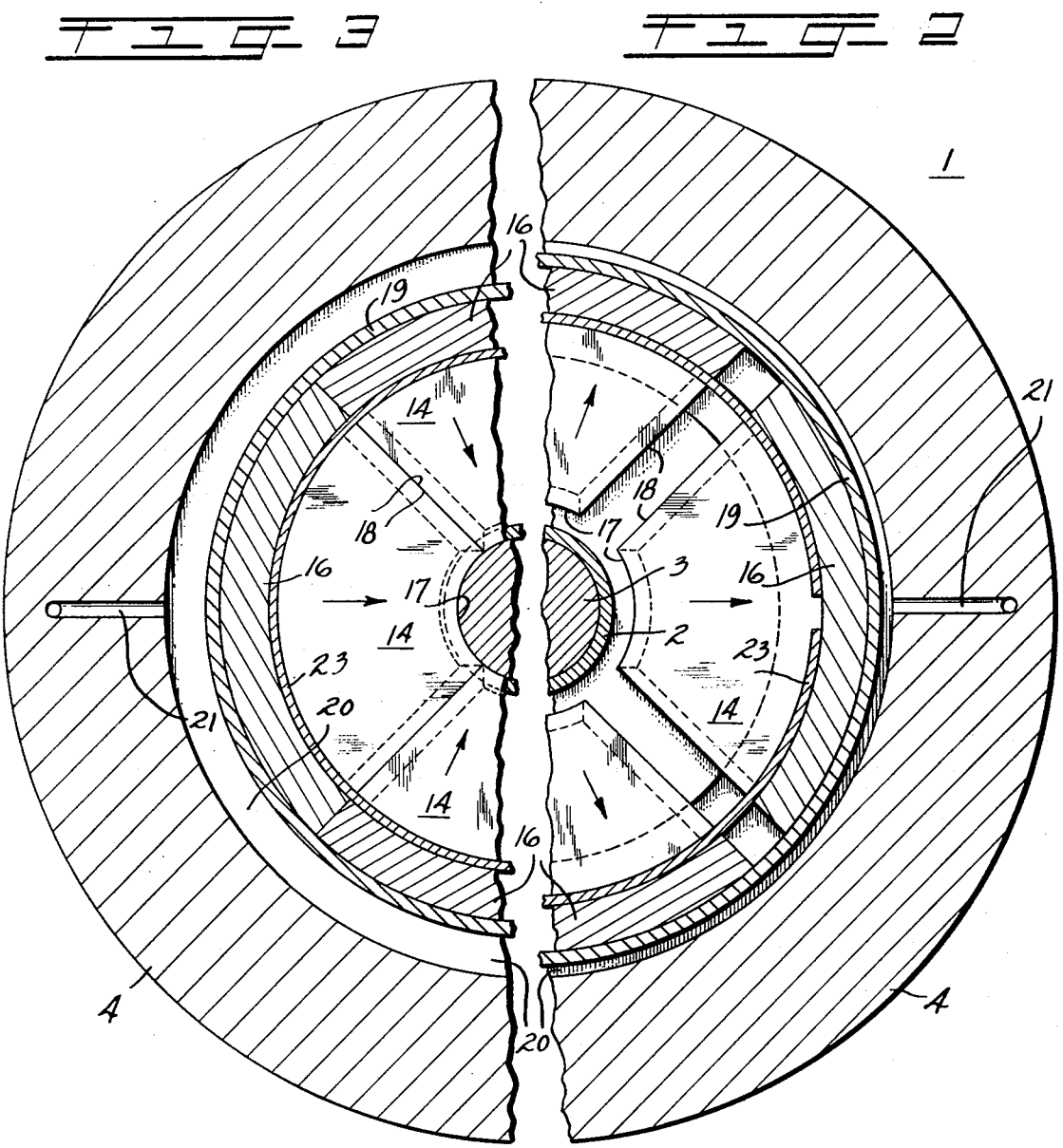

3,756,108

TUBE CUTTER

BACKGROUND OF THE INVENTION

1. Field of the Invention

This invention relates broadly to apparatus for cutting tubes. More specifically, this invention relates to apparatus for transversely severing a tube about its circumference without leaving a flash around the line of severance.

2. Description of the Prior Art

In one form of prior art apparatus, a tube to be cut is positioned on a pair of aligned mandrels and received within a pair of aligned dies positioned concentrically about the mandrels. The mandrels and dies are moved transversely of each other to cause transverse shearing of the tube.

In another form of prior art apparatus, the cutting tool comprises a cutting wheel which is advanced around the outer surface of a tube to be cut, each pass of the cutting tool around the tube being accompanied by a radially inward adjustment of the cutting wheel to cause the cut to become increasingly deeper with each pass until the tube is cut.

The above mentioned prior art apparatus and the methods practiced thereby for cutting tubes, as well as the other apparatus and methods which they typify, are both expensive and somewhat less than entirely satisfactory in their operation. They have been expensive to the extent that their mode of operation is protracted, and have been somewhat less than satisfactory to the extent that they create and leave flashes on the tubes along the line of severance, which flashes for most applications must be removed by a separate manufacturing operation thereby generating additional expense.

Representative prior art appears in the following patents:

U.S. Pat. No. 3,374,697 (1968) to Robinson
U.S. Pat. No. 3,279,289 (1966) to Wendricks
U.S. Pat. No. 3,273,433 (1966) to Borzym
U.S. Pat. No. 1,981,059 (1934) to Matthews et al.

SUMMARY OF THE INVENTION

One of the objects of this invention is to provide improved apparatus for cutting tubes.

Another of the objects of this invention is to provide improved apparatus for transversely severing a tube about its circumference without leaving a flash around the line of severance.

A further object of this invention is to provide improved apparatus for rapidly and smoothly severing a tube about its circumference.

Still other and further objects of this invention will become apparent during the course of the following description and by reference to the accompanying drawings and the appended claims.

Briefly, I have discovered that the foregoing objects may be obtained by providing a plurality of wedge-shaped, radially convergent cutting members having spaced arcuate front cutting edges for engaging and severing the tube, and also having spaced side cutting edges for engaging and severing any flashing produced by the cutting action of the front cutting surfaces.

BRIEF DESCRIPTION OF THE DRAWINGS

Referring now to the drawings in which like numerals represent like parts in the several views:

FIG. 1 represents a medial longitudinal section of the tube cutter of the present invention;

FIG. 2 represents a transverse half section of the tube cutter taken along the line A—A of FIG. 1, with the cutting members in open position;

FIG. 3 represents a transverse half section of the tube cutter taken along the line A—A of FIG. 1, with the cutting members in closed position; and FIG. 4 represents a view in perspective of one of the cutting members.

DESCRIPTION OF THE PREFERRED EMBODIMENT

Tube cutter 1 for severing tube 2, preferably internally supported on mandrel 3, is seen as comprising housing 4 having female threaded portions 5 and 6 above and below, respectively, an internal land portion 7, and threaded members 8 and 9 screwed into threaded portions 5 and 6; respectively. Members 8 and 9 are provided with aligned central apertures 10 and 11, respectively, which apertures 10 and 11 are of diameter such as to slidably receive tube 2.

The facing sides of members 8 and 9 are recessed, as shown in FIG. 1, thereby to define, in cooperation with land portion 7 of housing 4, an annular chamber 12, and further to define therebetween, a transversely arranged circular chamber 13 open toward the external surface of tube 2.

A plurality of radially arranged wedge-shaped cutting members 14 are positioned in tube cutter 1, between members 8 and 9. Each cutting member 14 comprises a main body portion 15 slidably mounted in circular chamber 13, a rear enlarged portion 16 slidably mounted within chamber 12, and spaced forward arcuate cutting edges 17 projecting from the top and bottom surfaces of main body portion 15. Along the top and bottom surfaces of main body portion 15 are provided spaced side cutting edges 18 proportioned to engage the side cutting edges 18 of the adjacent cutting member 14 when the cutting members 14 are fully extended radially inwardly.

Mounted within annular chamber 12 is a resilient member 19 which completely surrounds all of the cutting members 14 and which defines, with land portion 7 of housing 4, an expandable chamber 20 communicating through openings 21 formed through housing 4, with a source (not shown) of pressurized fluid. Seals 22 are provided as shown.

Positioned within annular chamber 12 are circular leaf springs 23 biased to bear outwardly against the upper and lower portions of enlarged portions 16 of all cutting members 14 and to urge all of said cutting members 14 radially outwardly.

The operation of the present invention will now be described.

Tube 2, preferably supported on mandrel 3, is inserted into central apertures 10 and 11, and that portion of tube 2 at which the cuts are to be made is aligned with arcuate cutting edges 17. So far, cutting members 14 have been urged radially outwardly to an expanded state by means of leaf springs 23 bearing against rear enlarged portions 16 of the cutting members 14.

Fluid pressure is now introduced through openings 21 into expandable chamber 20 and therein acting on resilient member 19 which, in effect, constitutes the moving wall of the said expandable chamber 20, whereupon resilient member 19 simultaneously forces all of said cutting members 14 radially inwardly thereby to force arcuate cutting edges 17 through the wall of tube 2 against mandrel 3, the said arcuate cutting edges 17 meeting and forming the perimeters of two longitudinally spaced closed circles in this contracted state whereby to sever the tube 2 completely around its perimeter in two longitudinally spaced planes. Simultaneously, side cutting edges 18 of each cutting member 14 engage, in this contracted condition of cutting members 14, the side cutting edges 18 of the adjacent cutting member 14, whereby a small length of tube 2 is severed between the spaced arcuate cutting edges 17 and may subsequently, be discarded, and any flash of material produced during this cutting operation and projecting into the space between the spaced side cutting elements is excised together with the hereinabove mentioned small length of tube 2. In this manner, clean flashless cuts are made in tube 2 and the severed portions of tube 2 may be withdrawn.

Upon release of pressure from expandable chamber 20, leaf springs 23, bearing against the enlarged rear portions 16 of cutting members 14, urge the said cutting members 14 radially outwardly to an expanded state.

What I claim is:

1. Apparatus for flashlessly cutting transversely through the wall of a tubular member thereby to sever the tubular member, said apparatus comprising:
   a. a circular array of radially reciprocable cutting members, said circular array having a central aperture adapted to receive said tubular members;
   b. each cutting member comprising:
      i. first cutting means on the forward end thereof adjacent said central aperture and adapted to face said tubular member;
      ii. second cutting means mounted to a side of said cutting member and adapted to engage second cutting means on the side of the adjacent cutting member when said cutting members are radially inwardly advanced into the said central aperture and through the wall of said tubular member;
   c. operating means associated with said cutting members to simultaneously advance all of said cutting members radially inwardly of said circular array thereof into the said central aperture and through the wall of said tubular member thereby to cleanly transversely sever said tubular member and simultaneously therewith sever flash produced thereby; and
   d. said operating means comprises:
      i. a circular chamber surrounding the circular array of cutting member;
      ii. a movable wall constituting one wall of said circular chamber and contacting those ends of said cutting members remote from the central aperture;
      iii. conduit means communicating with said circular chamber and adapted to introduce pressurized fluid into said circular chamber on that side of said movable wall opposite said cutting members.

2. Apparatus for flashlessly cutting transversely through the wall of a tubular member thereby to sever the tubular member, said apparatus comprising:
   a. a circular array of radially reciprocable cutting members, said circular array having a central aperture adapted to receive said tubular member;
   b. each cutting member comprising:
      i. first cutting means on the forward end thereof adjacent said central aperture and adapted to face said tubular member;
      ii. second cutting means mounted to a side of said cutting member and adapted to engage second cutting means on the side of the adjacent cutting member when said cutting members are radially inwardly advanced into the said central aperture and through the wall of said tubular member;
   c. operating means associated with said cutting members to simultaneously advance all of said cutting members radially inwardly of said circular array thereof into the said central aperture and through the wall of said tubular member thereby to cleanly transversely sever said tubular member and simultaneously therewith sever flash produced thereby;
   d. each of said cutting members being formed with an enlarged rear end;
   e. said operating means comprising:
      i. a circular chamber surrounding the circular array of cutting members;
      ii. a movable circular wall constituting the inner wall of said circular chamber and contacting the enlarged rear ends of said cutting members;
      iii. conduit means communicating with said circular chamber and adapted to introduce pressurized fluid into said circular chamber on that side of said movable wall opposite said cutting members.

3. Apparatus as in claim 2, further comprising:
   f. retracting means engaging said enlarged rear ends of said cutting members and adapted to simultaneously withdraw all of said cutting members radially outwardly from said central aperture.

4. Apparatus as in claim 3, wherein:
   g. said retracting means comprises a spring member located inwardly of said enlarged rear ends of said cutting members and urging said cutting members radially outwardly.

5. Apparatus for flashlessly cutting transversely through the wall of a tubular member thereby to sever the tubular member, said apparatus comprising:
   a. a circular array of radially reciprocable cutting members, said circular array having a central aperture adapted to receive said tubular member;
   b. each cutting member comprising:
      i. first cutting means on the forward end thereof adjacent said central aperture and adapted to face said tubular member;
      ii. second cutting means mounted to a side of said cutting member and adapted to engage second cutting means on the side of the adjacent cutting member when said cutting members are radially inwardly advanced into the said central aperture and through the wall of said tubular member;
   c. operating means associated with said cutting members to simultaneously advance all of said cutting members radially inwardly of said circular array thereof into the said central aperture and through the wall of said tubular member thereby to cleanly transversely sever said tubular member and simultaneously therewith sever flash produced thereby;

d. each of said cutting members having a first surface and a second surface longitudinally spaced therefrom;
e. the first cutting means on each cutting member comprising:
  i. a first forward cutting edge adjacent said first surface;
  ii. a second forward cutting edge adjacent said second surface and longitudinally spaced from said first forward cutting edge;
f. the second cutting means on each cutting member comprising:
  i. a first side cutting edge adjacent said first surface behind said first forward cutting edge;
  ii. a second side cutting edge adjacent said second surface and longitudinally spaced from said first side cutting edge and behind said second forward cutting edge.

6. Apparatus as in claim 5, wherein:
g. said first forward cutting edge and said first side cutting edge form a continuous cutting edge extending along the forward end and the side of said cutting member adjacent said first surface,
h. said second forward cutting edge and said second side cutting edge form a continuous cutting edge extending along the forward end and the side of said cutting member adjacent the second surface.

7. Apparatus as in claim 5, wherein:
g. the second cutting means on each cutting member further comprises:
  iii. a third side cutting edge adjacent said first surface behind said first forward cutting edge and opposite said first side cutting edge,
  iv. a fourth side cutting edge adjacent said second surface behind said second forward cutting edge and opposite said second side cutting edge and longitudinally spaced from said third side cutting edge.

8. Apparatus as in claim 7, wherein:
h. said first forward cutting edge, said first side cutting edge and said third side cutting edge form a continuous cutting edge extending along two opposite sides and the forward end of said cutting member adjacent said first surface;
i. said second forward cutting edge, said second side cutting edge and said fourth side cutting edge form a continuous cutting edge extending along two opposite sides and the forward end of said cutting member adjacent said second surface.

* * * * *